(12) United States Patent  
Robert et al.

(10) Patent No.: US 8,783,107 B2
(45) Date of Patent: Jul. 22, 2014

(54) RESONANT INERTIAL MICROSENSOR WITH VARIABLE THICKNESS PRODUCED BY SURFACE ENGINEERING

(75) Inventors: Philippe Robert, Grenoble (FR); Laurent Duraffour, Voiron (FR)

(73) Assignee: Commissariat a l'Energie Atomique, Paris (FR)

( * ) Notice: Subject to any disclaimer, the term of this patent is extended or adjusted under 35 U.S.C. 154(b) by 268 days.

(21) Appl. No.: 11/724,795

(22) Filed: Mar. 15, 2007

(65) Prior Publication Data

US 2007/0222011 A1 Sep. 27, 2007

(30) Foreign Application Priority Data

Mar. 27, 2006 (FR) ...................................... 06 51053

(51) Int. Cl.
*G01P 15/097* (2006.01)
(52) U.S. Cl.
USPC ....................................................... 73/514.29
(58) Field of Classification Search
USPC .......................................... 73/514.29, 504.12
See application file for complete search history.

(56) References Cited

U.S. PATENT DOCUMENTS

| | | | | |
|---|---|---|---|---|
| 4,939,935 A | * | 7/1990 | Amand | 73/514.29 |
| 5,996,411 A | * | 12/1999 | Leonardson et al. | 73/514.29 |
| 6,003,372 A | | 12/1999 | Kawakami et al. | |
| 6,122,965 A | | 9/2000 | Seidel et al. | |
| 6,250,158 B1 | * | 6/2001 | Stewart | 73/504.14 |
| 6,311,556 B1 | | 11/2001 | Lefort et al. | 73/514.29 |
| 6,389,898 B1 | * | 5/2002 | Seidel et al. | 73/514.29 |
| 7,134,339 B2 | * | 11/2006 | Mikado et al. | 73/514.29 |
| 2001/0015102 A1 | | 8/2001 | Janiaud et al. | 73/514.01 |
| 2006/0032306 A1 | | 2/2006 | Robert | 73/504.02 |
| 2006/0156819 A1 | | 7/2006 | Robert | 73/514.32 |
| 2007/0012110 A1 | | 1/2007 | Robert | 73/514.32 |
| 2008/0038921 A1 | | 2/2008 | Gouda et al. | |

FOREIGN PATENT DOCUMENTS

| | | |
|---|---|---|
| FR | 2685964 A1 | 9/1993 |
| FR | 2763694 A1 | 11/1998 |
| FR | 2784752 A1 | 4/2000 |
| FR | 2874257 A1 | 2/2006 |
| JP | H1-302166 A | 12/1989 |
| JP | H06-011400 A | 1/1994 |
| JP | H10-26532 A | 1/1998 |
| JP | H10-122867 A | 5/1998 |
| JP | H10-177033 A | 6/1998 |
| JP | H11-214706 A | 8/1999 |
| JP | 2000-146592 A | 5/2000 |
| JP | 2005-254430 A | 9/2005 |
| JP | 2005-337874 A | 12/2005 |

OTHER PUBLICATIONS

Preliminary Seach Report, FA 680827 and FR 0651053, 3 pgs, (Dec. 13, 2006).

(Continued)

*Primary Examiner* — John Chapman, Jr.
(74) *Attorney, Agent, or Firm* — Nixon Peabody LLP

(57) ABSTRACT

The invention relates to a surface-type MEMS resonant sensor, comprising a resonator (4) with excitation in a plane, which sensor comprises:
a first, so-called thick area (2), having a first thickness (E1), forming a seismic mass; and
a second, thin area (4), having a second thickness (E2), lower than the first, for detection.

10 Claims, 8 Drawing Sheets

(56) References Cited

OTHER PUBLICATIONS

Aikele, M. et al., "Resonant Accelerometer With Self-Test", Sensors and Actuators A, Elsevier Sequoia S.A., Lausanne, CH, vol. 92, No. 1-3, Aug. 1, 2001, pp. 161-167, XP004274041, ISSN: 0924-4247, Fig. 1.

Hierold, Christofer, "From Micro-To Nanosystems: Mechanical Sensors Go Nano", Journal of Micromechanics & Microengineering, Institute of Physics Publishing, Bristol, GB, vol. 14, No. 9, (Sep. 1, 2004), pp. S1-S11, XP020069754, ISSN: 0960-1317.

Hopkins, Ralph E. et al., "The Silicon Oscillating Accelerometer: A MEMS Inertial Instrument for Strategic Missile Guidance", AIAA from the Missile Science Conference held in Monterey, CA, pp. 44-51, Nov. 7-9, 2000.

Burns, D.W. et al., "Sealed-Cavity Resonant Microbeam Accelerometer", Sensors and Actuators A 53, 1996, pp. 249-255.

Notice of Rejection in Japanese Application No. 2007-080397, dated May 29, 2012.

Japanese Office Action for Application No. 2007-080397 dated Feb. 19, 2013.

Decision of Rejection and Decision of Non-Acceptance of Amendments in Japanese Application Serial No. 2007-080397, prepared Oct. 21, 2013.

\* cited by examiner

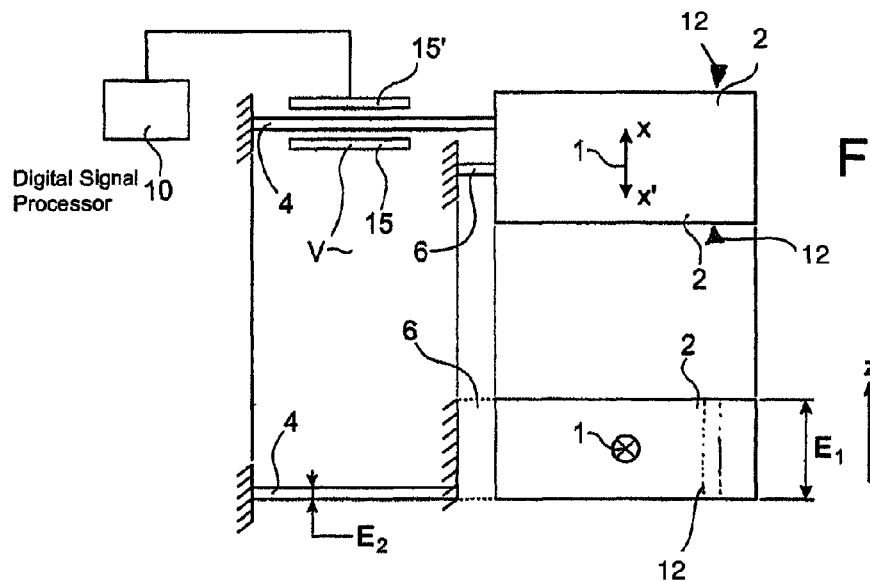
FIG.1A
FIG.1B
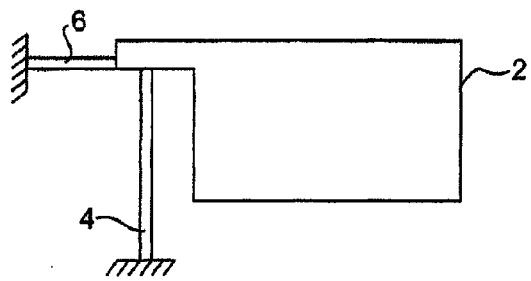
FIG.1C
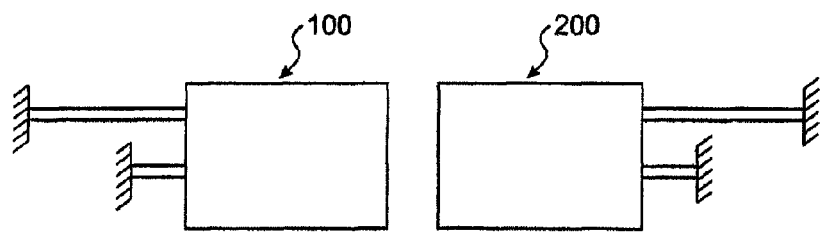
FIG.1D

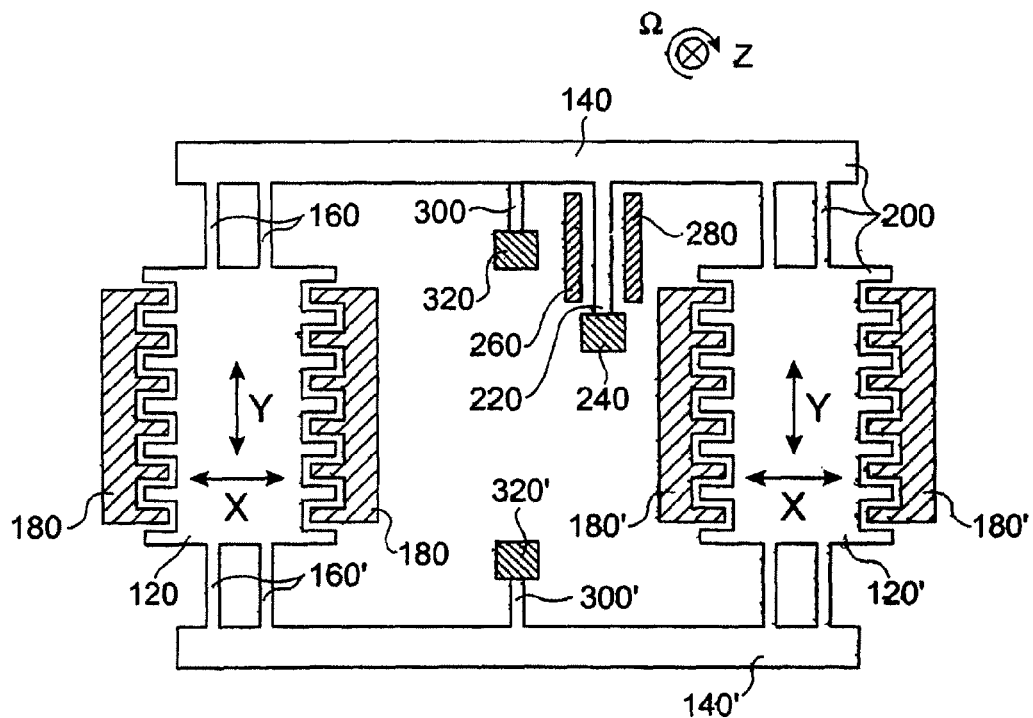
FIG.8
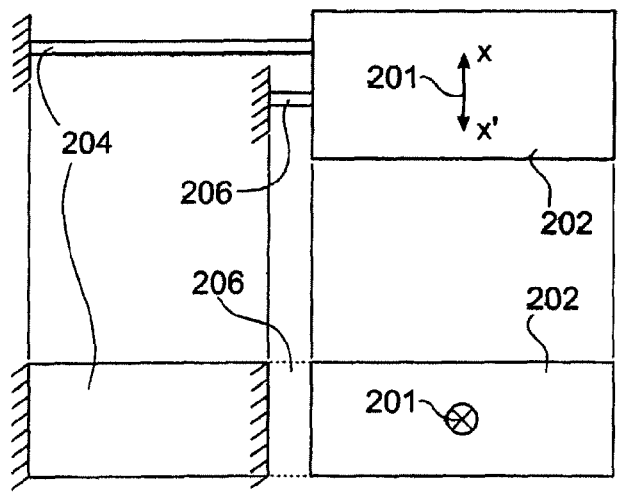
FIG.9A
(PRIOR ART)
FIG.9B
(PRIOR ART)

RESONANT INERTIAL MICROSENSOR WITH VARIABLE THICKNESS PRODUCED BY SURFACE ENGINEERING

CROSS-REFERENCE TO RELATED PATENT APPLICATION OR PRIORITY CLAIM

This application claims the benefit of a French Patent Application No. 06-51053, filed on Mar. 27, 2006, in the French Intellectual Property Office, the disclosure of which is incorporated herein in its entirety by reference.

FIELD OF THE INVENTION

This invention relates to the field of microsensors, in particular made of silicon, for example inertial sensors, in particular accelerometers or gyrometers.

It is applicable in various fields, such as the automobile, mobile telephone and aviation industries.

Resonant sensors can be produced, in a known manner, by:
- volume technology, in which the sensitive element of the sensor is produced on the entire thickness of a silicon or quartz substrate, using wet etching; such a technique is described in document FR 2 763 694;
- surface technology: this technique is described in the document "Resonant accelerometer with self test", of M. Aikele et al., Sensors and Actuators, A92, 2001, p. 161-167.

The inertial sensors made of volume technology are based on electrostatic excitation outside the plane of the resonator. Therefore, they require the transfer of two substrates, of which one serves to produce the excitation/detection electrode(s) and the other serves to close the cavity under vacuum pressure. The technologies used are therefore burdensome.

In addition, the resonator then has a thickness different from the seismic mass. This thinning is, among other things, made necessary by the beam vibration mode, which occurs outside the plane.

Another problem with this type of technique lies in the positioning of the resonator, which cannot be optimised to enhance the lever principle. Indeed, to minimise the gap between the resonator and its excitation electrode, the resonator is placed at the surface of the substrate. Optimally, the resonator should be located as close as possible to the hinge (axis of rotation of the mass).

In an inertial sensor made by surface engineering, the resonator vibrates in a plane. The principle of an inertial sensor according to the prior art is shown in FIGS. 9A and 9B, respectively in a top view and a cross-section view.

In these figures, an axis XX' 201 is the sensitive axis of the sensor. The references 202, 204 and 206 designate respectively a seismic mass, a resonator and a hinge. The cross-section view shows that the mass 202 and the resonator 204 have the same thickness.

The sensitive element 202 has a surface (from the top view) on the order of the $mm^2$.

However, in a number of applications, and in particular mass-production applications such as in the automobile or mobile telephone industry, where there is an increasing demand for sensors, the miniaturisation of the components is an important issue, due in particular to the race to ensure lower prices, an increase in functionalities (increasing number of sensors), integration with processing electronics and the reduction of energy consumption.

It is therefore necessary to find a new design for further miniaturised components with an even lower mass than those currently known, with a bulk, for accelerometers, of preferably less than $0.1\ mm^2$ or even $0.01\ mm^2$.

Similarly, still for the purpose of miniaturisation, we are seeking to combine electronics and MEMS and/or NEMS on a single substrate. For this combination, there are two options.

A first, so-called "Above IC" (or AIC) approach consists of transferring the MEMS to the MOS circuit once produced. The MEMS is in this case produced by deposited layers. The metrological performances of the sensors thus produced are then rather limited, since the mechanical qualities of the materials deposited are relatively low with regard to what is obtained when using monocrystalline Si.

The "In-IC" approach consists of producing the MEMS at the same level as the CMOS circuits. In this case, it is possible to have access to the monocrystalline Si in order to produce the MEMS and thus obtain good performance.

For sensors of class $10^{-2}$ (and beyond), it seems unrealistic to obtain the required level of performance by AIC technology in the desired sizes. The "In-IC" approach therefore appears to be much more promising. However, this approach does not make sense unless the mechanical structures are sufficiently miniaturised. Indeed, to make this integration economically realistic, it is suitable to minimise the silicon surface occupied by the sensor to the advantage of the CMOS circuits. The maximum bulk for an accelerometer of this type is estimated at around $0.05\ mm^2$, not to be exceeded. By way of comparison, the conventional surface of the sensitive element of an MEMS accelerometer (of class $10^{-2}$ or of the 10 G measuring range) rarely goes below $0.5\ mm^2$ (not taking into account the contact pads). For an MEMS gyroscope, the usual surface of the sensitive element is more than $20\ mm^2$.

In general, regardless of the type of inertial sensor, the miniaturisation by simple homothetic reduction of the size inescapably involves a significant loss of sensitivity. This is indicated in the article by C. Herold, Journal of Micromechanics and Microengineering, vol. 14, S1-S11, vol. 14, 2004, "from micro- to nanosystems: mechanical sensors go nano".

In other words, the homothetic miniaturisation involves a "relative rigidification" of the mechanical structure with respect to inertial forces.

Therefore, in addition to the problem of finding a new design for increasingly miniaturised components, there is the problem of overcoming this significant reduction in sensitivity that accompanies any reduction in the size of the components.

BACKGROUND OF THE INVENTION

To solve these problems, the invention proposes producing MEMS sensors with resonator detection using "3D" planar technology.

The invention relates to a resonant MEMS sensor made by surface engineering, with excitation of the resonator in a plane, with multiple thicknesses. It is, for example, an accelerometer or a gyrometer. It is typically possible to have two different thicknesses on the same component, but also more than two thicknesses, for example three.

A first thick area has a first thickness, and is used for the seismic mass portion, for example an accelerometer or a gyrometer. A second thin area has a second thickness lower than the first. The ratio between these two thicknesses is, for example, between 2 and 10. The second area is used for detection and possibly for the production of hinges (or a torsion axis in the case of a gyroscope).

According to the invention, the design of the resonant sensors made by surface engineering is modified by decorrelating the seismic mass part from the detection part.

The first area preferably has a surface S smaller than 0.1 mm² for an accelerometer and smaller than 5 mm² for a gyrometer.

The first and the second areas can be formed in the superficial semiconductor layer of a SOI substrate.

A sensor according to the invention can also comprise a third area forming a hinge (or a torsion axis in the case of a gyrometer), said third area having a thickness between that of the first area and that of the second area, or equal to that of the first area, or equal to that of the second area.

The invention makes it possible to separately optimise various parts of the sensor:
the resonator(s),
the hinge(s) or the torsion axis,
the seismic mass.

It is also compatible with a very inexpensive "In-IC" approach.

Mechanical stops can be provided to limit the movement of the seismic mass.

Digital detection means can also be provided, for example comprising means for digital filtering and/or digital processing of the signal.

The invention also relates to a method for producing a device according to the invention, implementing etching steps that are differentiated, in depth, perpendicular to a plane of the seismic mass, of the first and/or second and/or third areas.

The invention relates in particular to a method for producing a surface-type MEMS resonant sensor, comprising a resonator with excitation in the plane, which method comprises:
the formation of a thick area, having a first thickness ($E_1$), forming a seismic mass,
the formation of a thin area, having a second thickness ($E_2$), lower than the first, for detection.

The thick area and the thin area can be formed by etching a layer of semiconductor material in three dimensions.

They can be formed by etching a superficial layer of semiconductor material of an SOI substrate, in a direction (z) perpendicular to a main plane of said SOI substrate.

Such a method can also comprise the formation of a third area, called the hinge or torsion axis area, with a thickness between that of the first area and that of the second area, or equal to one of the thicknesses of said two areas.

The thin area is advantageously produced in a superficial semiconductor layer, with the thick area being produced in an epitaxial semiconductor layer on said superficial layer and in said superficial layer.

BRIEF DESCRIPTION OF THE DRAWINGS

FIGS. 1A and 1B show, in a top view and a side view, respectively, an inertial sensor according to the invention.

FIG. 1C shows, in a top view, an inertial sensor according to the invention with another arrangement of the elements in a plane.

FIG. 1D shows, in a top view, a device according to the invention, with two inertial sensors according to the invention assembled differentially.

FIG. 8 shows a gyrometer.

FIGS. 9A and 9B show a top view and a side view, respectively, of an inertial sensor according to the prior art.

DETAILED DESCRIPTION OF SPECIFIC EMBODIMENTS

Figure 2A:
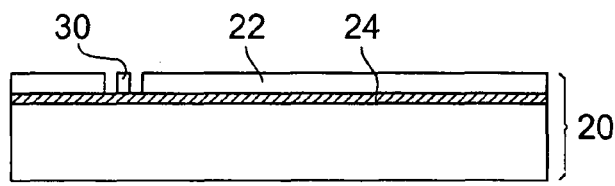
FIGS. 2A to 2G and 3A to 3F show a first embodiment of a method according to the invention.

An example of a resonant inertial sensor 100 according to the invention will be described in relation to FIGS. 1A and 1B. Such a sensor 100 can be, for example, an accelerometer or a gyrometer. It involves a sensor made by surface engineering with excitation of the resonator in a plane.

In these figures, an axis XX' 1 is the sensitive axis of the sensor. References 2 and 4 respectively designate a seismic mass and a resonator. Reference 6 designates a hinge in the case of an accelerometer and a torsion axis in the case of a gyrometer (a gyrometer is described below in relation to FIG. 8). The cross-section view (FIG. 1B) shows that the mass 2 and the resonator 4 do not have the same thickness: the mass 2 has a first thickness $E_1$, for example on the order of the µm, greater than the thickness $E_2$ of the resonator. The ratio $E_1/E_2$ is, for example, between 2 and 10.

The hinge makes it possible to maintain the seismic mass in a single plane, that of FIG. 1A or that defined by the seismic mass 2 of which the dimensions in the plane of FIG. 1A are clearly larger than in a direction perpendicular to this plane. The hinge has a thickness $E_3$ that can be equal to $E_1$ or to $E_2$ or between $E_1$ and $E_2$. As can be seen in FIG. 1A, the hinge 6 and the resonator 4 are produced parallel to a plane defined by the seismic mass 2, but (FIG. 1B) at different depths in a direction z substantially perpendicular to the plane of the mass 2. The hinge 6 is not necessarily parallel to the resonant portion 4; it can be arranged differently, for example as shown in FIG. 1C in which the references identical to those of FIGS. 1A and 1B designate identical or corresponding elements.

In this FIG. 1C, which shows a device according to the invention from the top view, the hinge is substantially perpendicular to the resonator. In the plane of the figures, arrangements other than those of FIGS. 1A-1B and 1C can be produced.

Reference 10 (FIG. 1A) designates means for digital processing of a signal coming from the system 100. These means can be used in the embodiments shown in the other figures, although they are not shown there.

The invention also applies to a differential structure, i.e. a structure in which sensors are assembled differentially. Thus, FIG. 1D diagrammatically shows a structure 100 as described above, and a second structure 200 of the same type, but assembled "head-to-tail" or differentially.

The resonator measurement is very suitable for miniaturisation of sizes. For example, an acceleration sensor according to the invention has a surface S (surface of the seismic mass 2, from the top view, or in the plane of FIG. 1A) smaller than 0.1 mm² or even 0.05 mm². In the case of a gyrometer, this larger value is preferably on the order of 5 mm².

A resonant sensor measures the frequency variation specific to a resonator (tuning fork- or vibrating beam-type) under the effect of an external stress (inertial force in this case). As the response exploited is a frequency, there are a number of advantages associated with the processing of electrical signals, such as the possibility of filtering the signal (noise limitation) and of digitally processing the data directly by means 10 for digital filtering and/or digital processing of the signal. In fact, it is a measurement of a vibration frequency by means of a capacitive measurement (i=d(CV)/dt−CdV/dt+V dC/dt, the measured amount being V dC/dt). In FIG. 1A, references 15, 15' respectively designate an excitation electrode and a detection electrode. An MOS measurement can also be performed, with the current of the channel being modulated by the movement of the resonant structure, which constitutes the gate of the transistor.

This resonant measurement principle also makes it possible:
to work with mechanical resonance, i.e. with optimised amplitudes for deflection of the vibrating body 2, and thus cleaner capacitive detection;
to have a precision of measurement with little dependence on the electrical noise associated with the capacitance variation.

In terms of sizing, the fact of notably reducing the cross-section of the resonator is not irrelevant.

The significant increase in sensitivity is equal to Δf/f, where Δf is the resonance frequency variation under the effect of mechanical stress caused by the movement of the seismic mass(es), as a function of acceleration, in the case of an accelerometer, or of the rotation speed in the case of a gyrometer. This increase can lead to a notable increase in the non-linearity of the response of the sensor according to the level of acceleration (for the accelerometer) or the rotation speed (for the gyrometer). Therefore, a good balance is desired between the measurement range, the mass of the sensitive element 2 and the cross-section of the resonator 4.

The reduction of the cross-section of the various mechanical elements in the thinned areas can lead to a significant concentration of stresses. These stresses can be analysed so as to prevent the buckling and rupture of these elements, under the effect of a shock, for example. To solve or limit this problem, it is possible to add mechanical stops limiting the movement of the mass. Such stops 12 are shown in FIG. 1B.

The thinning of the mechanical areas results in a movement of the stress exerted by the seismic mass 2 on each area. This thinning indeed leads to an offsetting of the centre of gravity of the mass at the point of application of the force on the resonator (at z, i.e. according to the thickness, see FIG. 1B). This offsetting can lead to a parasitic torque effect causing, for example, sensitivity to transverse accelerations.

The thinning of the resonator also reduces the capacity for excitation and/or detection of vibration. To limit the loss of electrical sensitivity, it is possible to place the electronics as close as possible (possibly by an "In-IC" production of the sensor) so as to limit the parasitic capacitances and/or resistances capable of damaging the signal-to-noise ratio.

To size a device according to the invention, it is possible to use "finite element"-type software, such as ANSYS or Coventor or any other design software such as FEMLab or Matlab.

In a resonant sensor according to the invention, the use of "3D" planar technology (i.e. with etching in the plane of the mass 2, but also perpendicular to said plane) makes it possible to decorrelate the detection part of the sensor (beam 4 or resonant tuning fork) of the inertial part (mass 2). This makes it possible to separately optimise these two elements in order to overcome the reduction in sensitivity caused by the miniaturisation of the inertial sensors. This separate optimisation is, for example, obtained during the production method, for example by separate etchings of the corresponding areas, as explained below.

Indeed, the inertial force applied to the resonator is directly proportional to the volume of the seismic mass involved. Therefore, any size reduction results in a decrease in this force and therefore a loss of sensitivity.

In the case of the detection resonator, the reduction of certain dimensions (cross-sections) of the resonator leads to an increase in sensitivity, i.e. a greater variation in resonance frequency for a given stress. In other words, the smaller the cross-section of the resonator is, the more the resonance frequency of the resonator varies according to the stress applied thereto. For a given external force exerted on the resonator, the variation in its resonance frequency f will be higher as the cross section of the resonator 4 is smaller:

$$f = f_0 \sqrt{1 + 0.29 \frac{L^2}{Elt^3} F_i}$$

with:
f: specific frequency of the resonator on which the axial stress $F_i$ is exerted;
$f_0$: the centre frequency without stress ($F_i$=0),
$F_i$: the inertial force applied to the beam 4,
L, t and l: respectively the length, the thickness and the width of the beam 4,
E: the Young module.
$\Delta f = f_{Fi \neq 0} - f_0$; $\Delta f/f_0$ is the susceptibility of the sensor, and increases as the cross-section of the resonator decreases.

It is desirable to reduce the term $tl^3$ in order to increase the ratio Δf/f.

A reduction in the lateral dimensions of the beam 2 results in an increase in sensitivity. This reduction in the lateral dimensions is nevertheless limited by the technology, i.e. by the lithography resolution and the aspect ratio of the etching (the width of the pattern to be etched is smaller by around 10 times the thickness to be etched for DRIE-type equipment; the reduction in the width of the resonator also tends to cause its quality factor to fall).

To even further reduce the cross-section of the resonator, it is possible to thin the resonator 2 without affecting the seismic mass 4 and the anchor fields; it can indeed be advantageous to thin other mobile parts of the sensor such as the hinges 6, in the case of an accelerometer, or the torsion axis in the case of a gyrometer. This involves the use of "3D" surface engineering (or planar technology), or a method according to the invention in which certain parts of the MEMS are selectively thinned.

Three examples of embodiments of a device according to the invention are shown below. These three examples can also be combined together. They are described in the case of an accelerometer. In the case of a gyrometer, the term "hinge" is replaced by the term "torsion axis".

A first method will be described in association with FIGS. 2A to 2G and 3A to 3F.

This first method implements semiconductor epitaxy (in this case: silicon; SiGe is another example), which makes it possible to produce the resonant part in a first, low thickness, then the seismic mass and the hinge in a second thickness, epitaxially grown on the first thickness and greater than said first thickness.

A SOI substrate 20 is first selected (FIG. 2A). For example, it comprises a layer 22 of Si with a thickness of 1 μm for a $SiO_2$ oxide layer 24 with a thickness of 0.4 μm.

Figure 3A:
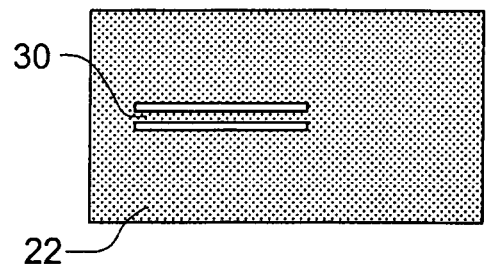
Figure 3B:
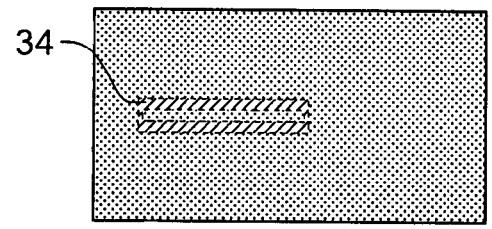
Figure 3C:
Figure 3D:
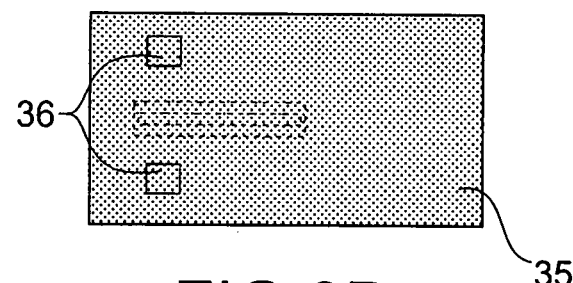
Figure 3E:
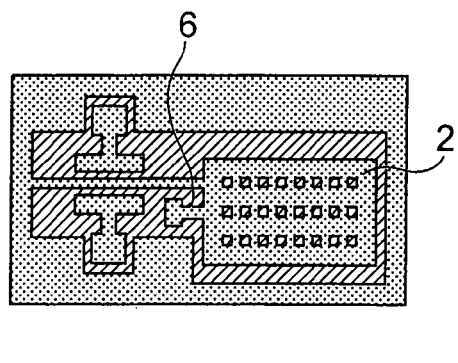

Next, the lithography then the etching of the Si layer 22 is performed in order to define the gap 30 of the resonator (FIGS. 2A and 3A). This gap is therefore defined in the superficial semiconductor layer with a low thickness.

Figure 2B:
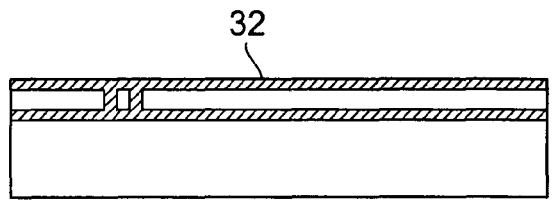
Figure 2C:
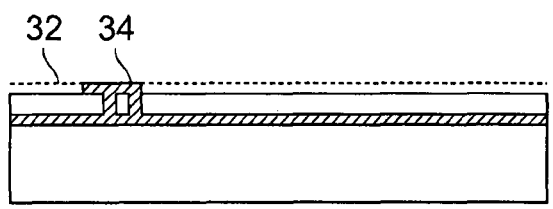
Figure 2D:
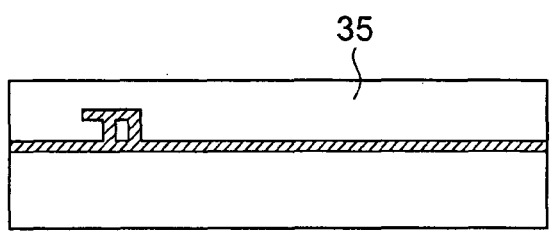
Figure 2E:
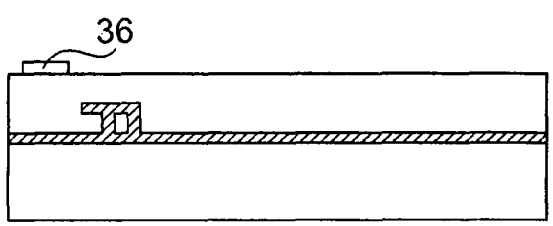
Figure 2F:
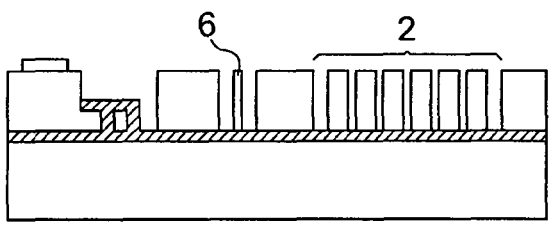

The etching is stopped on the $SiO_2$ layer. Then, the deposition of a $SiO_2$ layer, for example with a thickness of 2 μm, is performed (not shown), followed by levelling, stopping at the Si layer 22, then a deposition 32 of $SiO_2$, for example with a thickness of around 0.4 μm (FIG. 2B).

Then, the lithographic etching is performed (FIGS. 2C and 3B) in the SiO$_2$ layer 32, forming a protection 34 above the resonator, with overlapping at the level of the excitation/detection electrode.

Silicon epitaxy 35 is then performed (FIGS. 2D and 3C) on the initial superficial semiconductor layer 22, for example on a thickness of around 3 µm, greater than the thickness of the layer 32.

A Ti/Ni/Au metal deposition, followed by lithographic etching, are then performed (FIGS. 2E and 3D) in order to form contacts 36.

Then, lithography and anisotropic etching (for example: DRIE) are performed on the mechanical structure (FIGS. 2F and 3E), stopping at the SiO$_2$ dioxide layer 24. This step makes it possible to produce, during the same operation, the seismic mass and the hinge 6, on the same thickness of material.

Figure 2G:
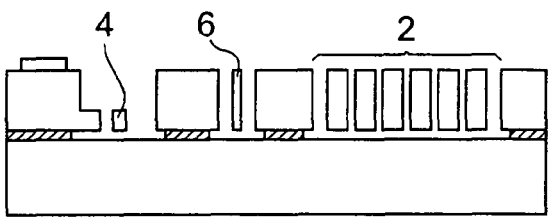
Figure 3F:
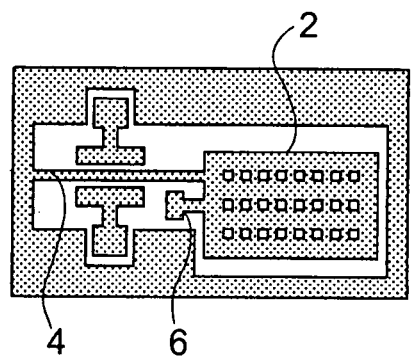

The device is then released by HF etching (wet or vapour) of the layer 24 (FIGS. 2G and 3F).

A second method according to the invention implements a thinning of the resonator 4 and the hinge 6 by etching (FIGS. 4A to 4F and 5A to 5E).

Figure 4A:
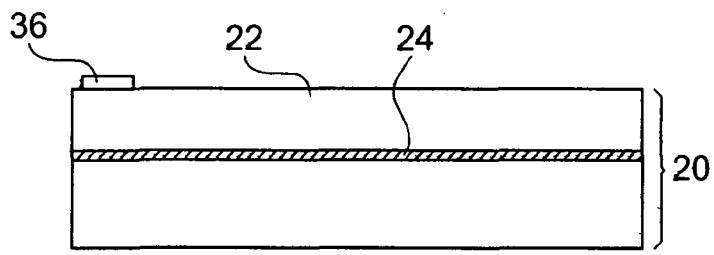
FIGS. 4A to 4F and 5A to 5E show a second embodiment of a method according to the invention.
Figure 4B:
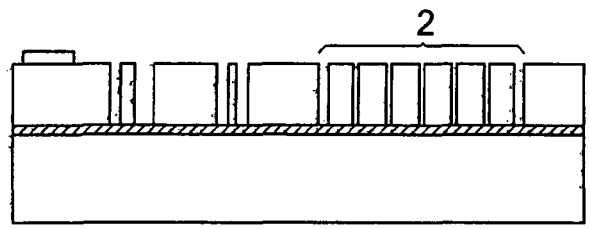
Figure 4C:
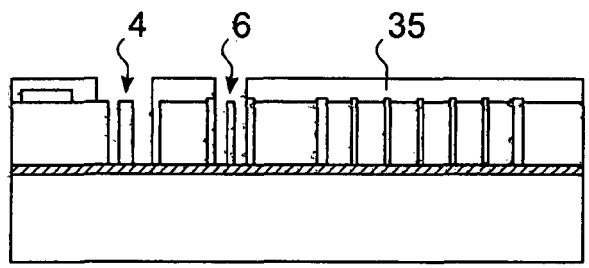

A SOI substrate 20 is first selected (FIG. 4A). For example, it comprises a layer 22 of Si with a thickness of 4 µm for a SiO$_2$ oxide layer with a thickness of 0.4 µm.

Figure 5A:
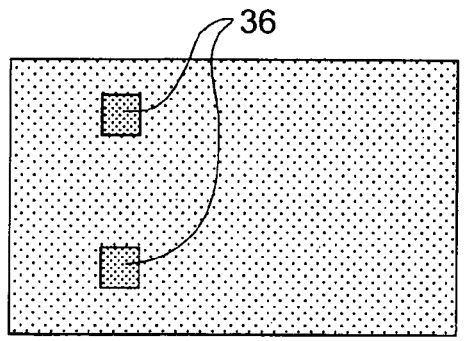
Figure 5B:
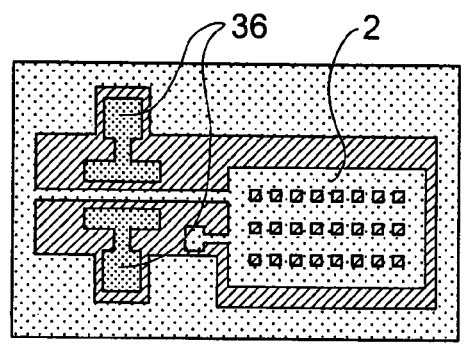
Figure 5C:
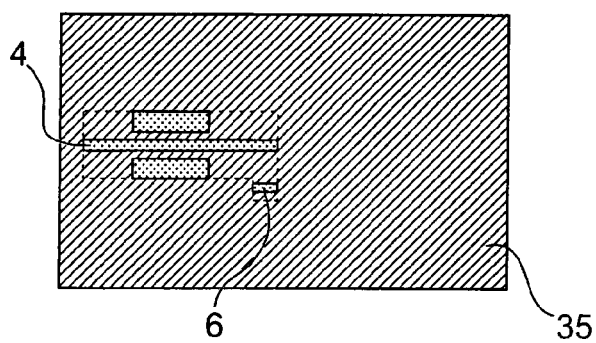

A Ti/Ni/Au metal deposition, followed by lithographic etching, are then performed in order to form contacts 36 (FIGS. 4A and 5A).

Then, the lithography and DRIE etching of the mechanical structure are performed (FIGS. 4B and 5B), stopping at the SiO$_2$ dioxide layer 24. This step makes it possible to produce, during the same operation and in the same thickness of material, the seismic mass 2 and the areas in which the hinge 6 and the resonant part 4 will be produced.

After deposition of a resin layer 35, the lithography is performed (FIGS. 4C and 5C), which makes it possible to produce an opening for the resonator 4, with an overlap at the level of the excitation/detection electrode and an opening on the hinge 6.

Figure 4D:
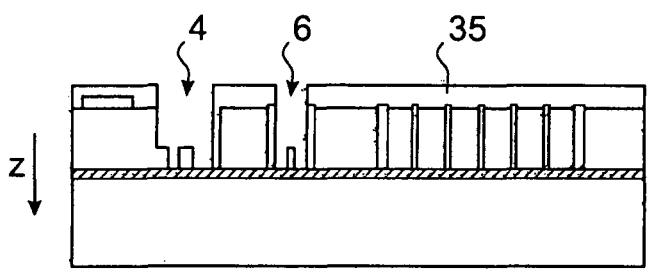
Figure 4E:
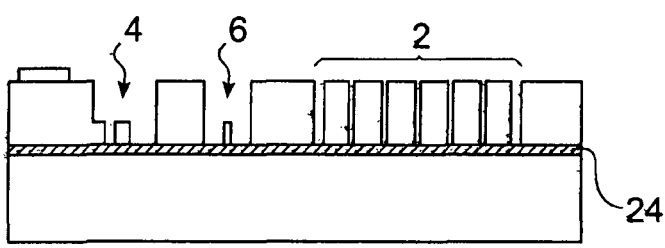
Figure 5D:
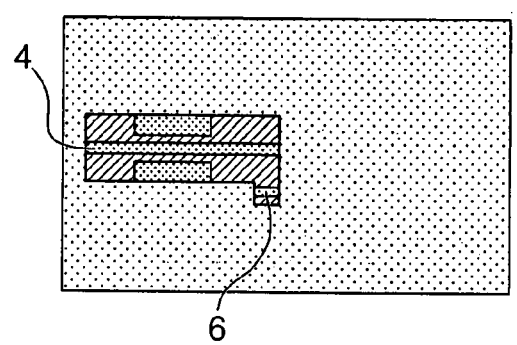

The areas of the hinge 6 and the resonator 4 are thinned, for example etched (by RIE or DRIE, for example) (FIGS. 4D and 5D). Then, the resin 35 is removed (FIG. 4E).

Figure 4F:
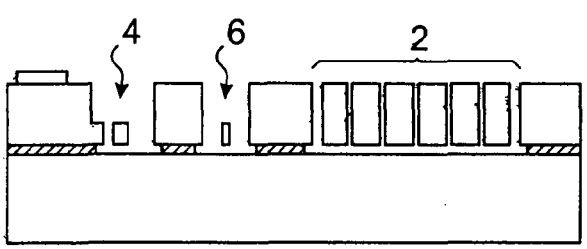
Figure 5E:
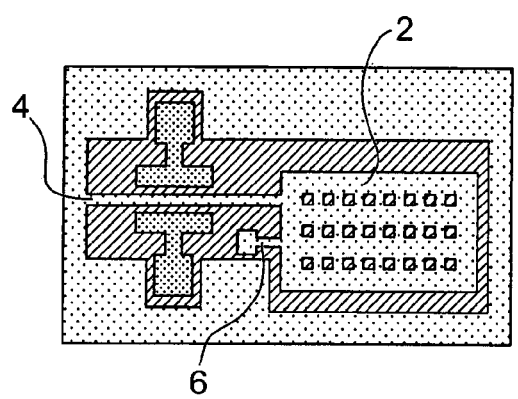

The device is released by HF etching (wet or vapour) of the layer 24 (FIGS. 4F and 5E).

In this method, the hinge and resonant areas have identical thicknesses because they are etched in depth, according to the axis z, in the same step, while the patterns of the area forming the seismic mass are not etched in this direction.

Figure 6A:
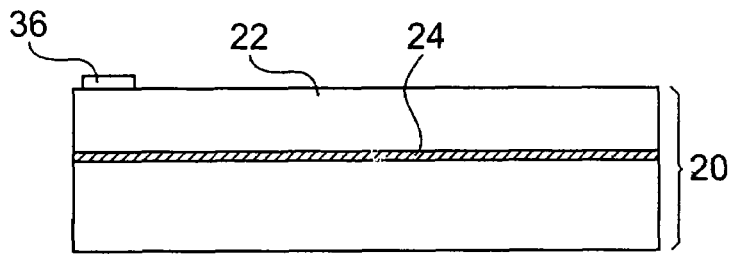
FIGS. 6A to 6E and 7A to 7E show a third embodiment of a method according to the invention.

A third method according to the invention is an alternative of the second embodiment, with, in addition, a differential thinning of the resonator 4 and the hinge 6 (or another mechanical part). A SOI substrate 20 is first selected (FIG. 6A). For example, it comprises a layer 22 of Si with a thickness of 4 µm for a SiO$_2$ oxide layer 24 with a thickness of 0.4 µm.

Figure 7A:
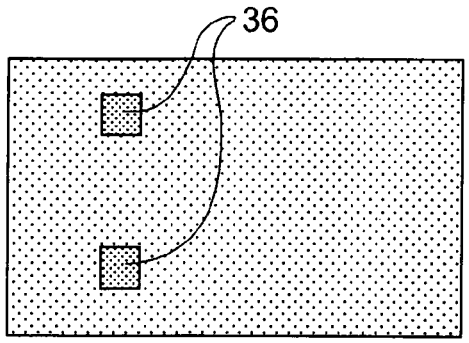

A Ti/Ni/Au metal deposition, followed by lithographic etching, are then performed in order to form contacts 36 (FIGS. 6A and 7A).

Figure 6B:
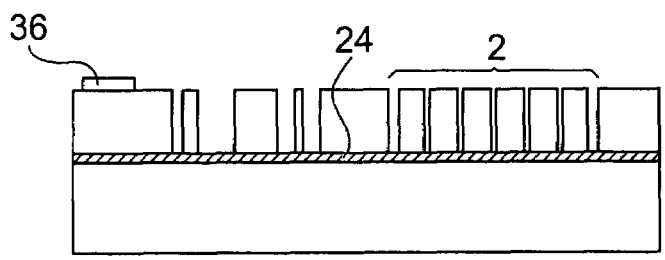
Figure 7B:
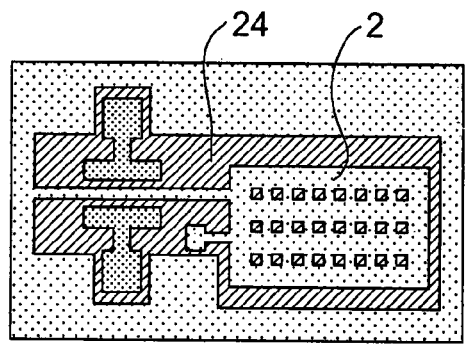
Figure 7C:
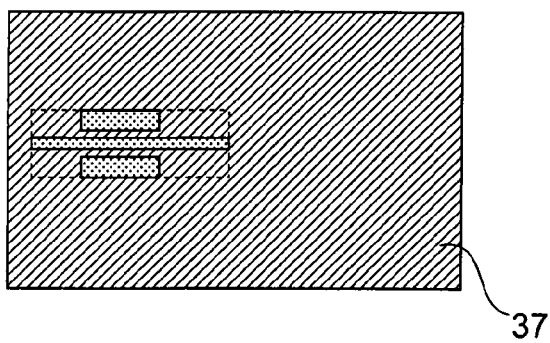
Figure 7D:
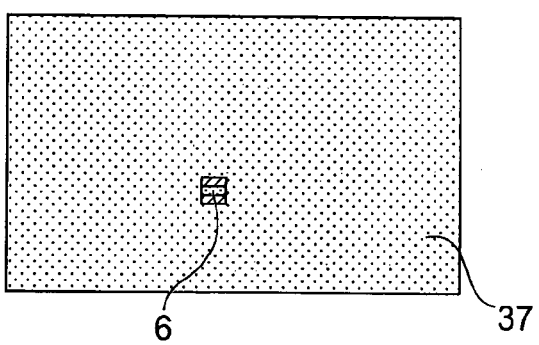

Then a resin deposition, lithography and etching (RIE or DRIE) of the mechanical structure are performed (FIGS. 6B and 7B), stopping on the SiO$_2$ dioxide layer 24. This step makes it possible to produce, during the same operation and in the same thickness of material, the seismic mass 2 and the areas in which the hinge 6 and the resonant part 4 will be produced.

Figure 6C:
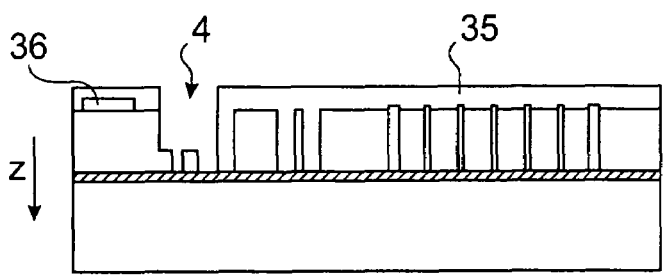
Figure 6D:
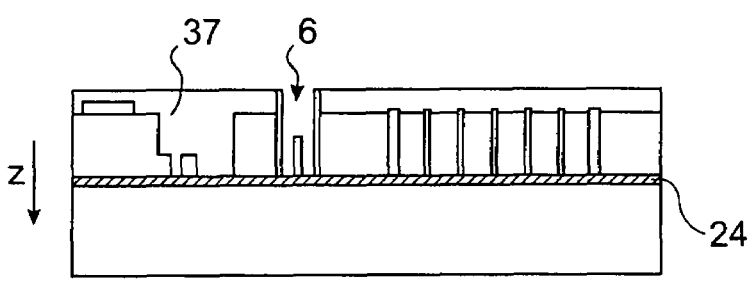

This step therefore makes it possible to etch the patterns of the area forming the seismic mass, the area forming the resonator and the area of the hinges. The patterns of the two latter areas will then be capable of being etched in depth, along the axis z (FIGS. 6C and 6D), but separately so as to be capable of controlling their final relative thickness.

Thus, after a resin deposition 35 (FIG. 6C), an opening for the resonator is produced by lithography, with an overlap at the level of the excitation/detection electrode.

An etching (RIE or DRIE) of the resonator is performed along the axis z, followed by the removal of the resin 35.

Then (FIG. 6D), after another deposition of resin 37, an opening is produced by lithography at the level of the hinge 6. Again, a DRIE etching is performed along the axis z, but on the hinge 6, and the resin 37 is removed.

Figure 6E:
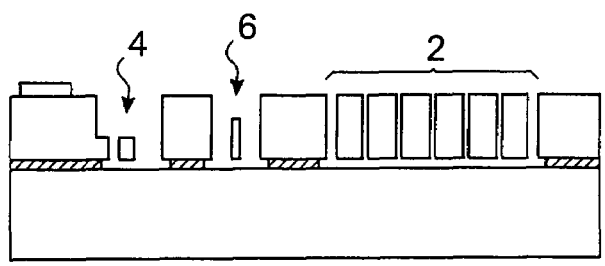
Figure 7E:
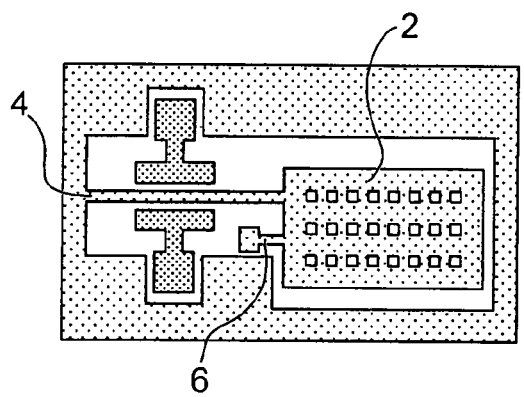

The device is released by HF etching (wet or vapour) of the layer 24 (FIGS. 6E and 7E).

In this third method, the hinge and resonant areas have thicknesses that are different from one another, and different from the thickness of the seismic area, because they are etched in depth, according to the axis z, during different steps, while the patterns of the area forming the seismic mass are not etched in this direction.

The first embodiment, although a bit more complex (it implements additional levelling and epitaxy steps), makes it possible to optimise the electrical sensitivity of the electro-mechanical resonator (optimisation of the signal-to-noise ratio by increasing the effective capacities). Indeed, the gap between the resonator and the excitation/detection electrodes is produced directly in a very fine silicon portion. As the gap is etched on a very fine thickness, it is possible to obtain a high machining resolution. In the other two embodiments, the resonators and gaps are produced on a high silicon thickness, limiting the fineness of the machining, before being thinned. For example, when estimating an aspect ratio of 10 for the DRIE etching, it is possible to obtain a gap of 0.2 µm on 2 µm of silicon, while it is not possible to go below 2 µm for a gap for 20 µm of silicon. The thinning after etching of the gap also further damages the inter-electrode space.

The invention implements areas of different thicknesses in a sensor. A sensor according to the invention can be produced by machining silicon or a semiconductor material in three dimensions.

A resonator according to the invention, obtained by 3D machining in a semiconductor material, is particularly suitable for a gyrometer with resonator detection. The principle of such a gyrometer is indicated in document FR 2 874 257, which is also diagrammatically shown in FIG. 8. It comprises a support (not shown) and two seismic masses 120, 120', which are mobile in the plane (X, Y) of the support, and which can in particular vibrate. These two masses are coupled by linking means, which are also mobile with respect to the support. In the context shown, two linking arms 140, 140', in this case parallel, are connected to the mobile masses by way of means 160, 160' flexible enough to enable relative movements of the two masses 120, 120' with respect to the arms 140, 140', while being rigid enough to transmit the movements of the masses 120, 120' to the arms 140, 140'. Preferably, the linking arms 140, 140' and the flexible means, or bending arms 160, 160' form a rectangular frame; the flexible means 160, 160' can, for example, be bending springs or an attachment tab. Means are provided for causing the masses 120, 120' to vibrate in the plane (X, Y) of the support, for example, excitation combs 180, 180' nested in one or both surfaces of each mobile mass 120, 120'. The combs 180, 180' cause, by means of electrostatic forces, a back-and-forth movement of each mass 120, 120' in a first direction X, in this case from left to right of the sheet; other means can also be envisaged, such as electromagnetic excitation.

In particular, the masses 120, 120' are excited, preferably at the resonance or in the vicinity of the resonance, by means of electrostatic forces applied by means of "interdigital" comb structures 180, 180'; the assembly of masses 120, 120' and linking means 140, 140', 160, 160' thus forms a first excitation resonator 200. The functioning at the resonance indeed makes it possible to obtain a high movement amplitude, and a high quality factor, increasing the sensitivity of the gyrometer. The vibration of the masses 120, 120' is advantageously out of phase, i.e. their movements are in opposite directions at each moment: the distance separating the two masses 120, 120' is variable, this variation being tolerated by flexible means 160, 160'. This allows for detection by second resonators.

When the gyrometer undergoes an angular movement around an axis Z perpendicular to the support, a Coriolis force is generated on each mass 120, 120', perpendicular to the axes X and Z and therefore in this case in the vertical direction Y of the sheet, coming from the composition of the vibration forced by the elements 180, 180' with the angular speed Ω. The Coriolis forces are transmitted to the arms 140, 140' by the flexible means 160, 160'; if a second resonator 220 is coupled to an arm 140, it is also subjected to a stress from the Coriolis force. This stress moves the resonance frequency of the detection resonator 220. The rotation speed Ω around the axis Z is then deduced from the frequency movement measured. In particular, the resonator 220 is excited and preferably controlled at its resonance peak or in the vicinity thereof; a digital electronic system makes it possible to easily reach the resonance frequency at each moment. The resonator 220 can, for example, be in the form of a vibrating beam as shown diagrammatically in FIG. 8, of which a first end is connected to the linking arm 140 and the other is anchored to the substrate by any known means 240. According to a preferred embodiment, the resonator 220 is capacitively excited at the resonance by stationary electrodes, which also serve for detection. It is also possible to have a detection electrode 260 separate from the excitation electrode 280. Electromagnetic excitation can also be envisaged, as can detection by piezoelectric gauge. To increase the possible detection and the sensitivity of the resonator 220, advantageously, each arm 140, 140' has a torsion axis 300, 300' intended to transform the Coriolis forces exerted at the level of the masses 120, 120' into a couple of forces around said torsion axis 300, 300', by a lever arm effect, which makes it possible to exert the greatest possible stress on the resonator. Each of the torsion axis is thus attached at one end to the support by an anchor 320, 320' and at the other end to the linking arm 140, 140', 160, 160', toward the centre of the structure 200 in order to limit the temperature drifts of the gyrometer.

Other embodiments are possible, as shown in FIGS. 4A to 4D of document FR 2874257, for example two resonators on the same linking arm 140 (FIG. 4A), or located on the same side of an axis of the mobile device defined by the torsion axis (FIG. 4B), or with tuning fork-type resonators (FIG. 4C), or with resonators arranged as in FIG. 4D of this same document.

For all of these devices, the invention makes it possible to produce one or more resonators having a cross-section or thickness lower than that of the seismic mass(es).

The forces involved for this type of component are extremely weak on the microsensor scale (Coriolis forces). The use of conventional surface engineering leads to very reduced sensitivity, even when pushing the technology to its limits, by attempting to minimise the width of the resonator (limits imposed by lithography and DRIE). The possibility of reducing the cross-section of the resonator by 3D machining makes it possible to envisage very high sensitivities that are difficult to obtain by the other designs of gyrometers with capacitive detection.

The invention makes it possible to have inertial sensors (accelerometers or gyrometers) with very good performance (sensitivity) for very reduced sizes.

What is claimed is:

1. A MEMS resonant sensor comprising:
    a first area fabricated in a substrate using micromachining technology, the first area having a first thickness, wherein the first area forms at least one seismic mass movable in a plane parallel to a substrate surface, and said first area being comprised of a first upper surface and a first lower surface, both extending parallel to said substrate surface;
    a second area fabricated in the substrate using micromachining technology, the second area having a second thickness, wherein the second thickness is less than half the first thickness, and wherein the second area forms a resonator, said resonator comprising a second upper surface and a second lower surface, the second upper surface and the second lower surface both extending parallel to said substrate surface, said resonator configured for capacitive excitation, said resonator being for detecting a movement of said seismic mass in said plane parallel to said substrate; and
    a hinge fabricated in the substrate using micromachining technology, the hinge to maintain the at least one seismic mass in a plane parallel to the substrate surface, said hinge comprising a third upper surface and a third lower surface, the third upper surface and the third lower surface both extending parallel to said substrate surface, the hinge and the resonator being anchored at one end to a same surface of said seismic mass, said same surface being perpendicular to said substrate surface, and at another end to said substrate,
    said first upper surface, said second upper surface and said third upper surface being in a same common plane parallel to said substrate surface, or said first lower surface, said second lower surface and said third lower surface being in a same common plane parallel to said substrate surface.

2. Sensor according to claim 1, wherein the sensor is an accelerometer, and wherein the first area has a surface S smaller than 0.1 mm$^2$.

3. Sensor according to one of claim 1, wherein the first and second areas are formed in the superficial semiconductor layer of a SOI substrate.

4. Sensor according to claim 1, wherein the hinge comprises a third area fabricated in the substrate.

5. Sensor according to claim 4, wherein the third area has a thickness between that of the first area and that of the second area.

6. Sensor according to claim 4, wherein the third area has a thickness equal to that of the first area.

7. Sensor according to claim 4, wherein the third area has a thickness equal to that of the second area.

8. Sensor according to claim 1, further comprising mechanical stops to limit the movement of the seismic mass.

9. Sensor according to claim 1, further comprising means for digital filtering and/or digital processing of a signal for detection of the excitation.

10. A surface detection device comprising a first MEMS resonant sensor according to claim 1 and a second MEMS resonant sensor according to claim 1.

* * * * *